US011591971B2

(12) United States Patent
Garabello et al.

(10) Patent No.: US 11,591,971 B2
(45) Date of Patent: Feb. 28, 2023

(54) HYBRID TRANSMISSION ON PROPELLER GEARBOX

(71) Applicant: GE Avio S.r.l., Turin (IT)

(72) Inventors: Marco Garabello, Turin (IT); Alessio Gargioli, Turin (IT); Fabrizio Bussi, Turin (IT); Giuseppe Argentieri, Turin (IT); Salvatore Garofalo, Turin (IT)

(73) Assignee: GE AVIO S.R.L., Turin (IT)

( * ) Notice: Subject to any disclaimer, the term of this patent is extended or adjusted under 35 U.S.C. 154(b) by 0 days.

(21) Appl. No.: 17/173,523

(22) Filed: Feb. 11, 2021

(65) Prior Publication Data

US 2021/0246835 A1    Aug. 12, 2021

(30) Foreign Application Priority Data

Feb. 11, 2020 (IT) .......................... 102020000002695

(51) Int. Cl.
| | | |
|---|---|---|
| *F02C 7/36* | (2006.01) | |
| *F02C 7/32* | (2006.01) | |
| *B64D 27/02* | (2006.01) | |

(52) U.S. Cl.
CPC .................. *F02C 7/36* (2013.01); *F02C 7/32* (2013.01); *B64D 2027/026* (2013.01); *F05D 2220/323* (2013.01); *F05D 2260/40311* (2013.01)

(58) Field of Classification Search
CPC ... F01D 15/10; F02C 7/32; F02C 7/36; H02K 7/1823; F05D 2220/76; F05D 2220/768; F05D 2260/40311; F16H 3/72; F16H 3/724
See application file for complete search history.

(56) References Cited

U.S. PATENT DOCUMENTS

| | | | |
|---|---|---|---|
| 4,829,850 A | 5/1989 | Soloy | |
| 6,895,741 B2 | 5/2005 | Rago et al. | |
| 8,324,746 B2 | 12/2012 | Bradbrook | |
| 8,986,146 B2 | 3/2015 | Gallet | |
| 9,214,841 B2 * | 12/2015 | Curti | ................... H02K 7/1163 |
| 10,017,266 B2 | 7/2018 | Phan et al. | |

(Continued)

FOREIGN PATENT DOCUMENTS

| | | |
|---|---|---|
| EP | 3460219 A1 | 3/2019 |
| WO | 2016090390 A1 | 6/2016 |
| WO | 2019243558 A1 | 12/2019 |

OTHER PUBLICATIONS

Talian Search Report issued in corresponding Italian Application No. 102020000002695, dated Sep. 9, 2020.

*Primary Examiner* — Todd E Manahan
*Assistant Examiner* — David P. Olynick
(74) *Attorney, Agent, or Firm* — Venable LLP; Peter T. Hrubiec; Michele V. Frank (57) ABSTRACT

A gearbox assembly for a gas turbine engine includes a planetary gear set comprising a sun gear, a planet gear, and a ring gear, the sun gear configured for connection to a first drive shaft of the gas turbine engine and the ring gear configured for connection to a second drive shaft of the gas turbine engine, and an electric machine assembly comprising an input and an electric machine. The electric machine comprising a rotor coupled to the input and a stator fixedly positioned within the gearbox assembly, the input of the electric machine assembly coupled to one of the sun gear, the ring gear, or the planet gear of the planetary gear set.

13 Claims, 7 Drawing Sheets

(56) References Cited

U.S. PATENT DOCUMENTS

| | | | |
|---|---|---|---|
| 2011/0165983 A1* | 7/2011 | Fox | F03D 15/00 |
| | | | 475/331 |
| 2013/0247539 A1* | 9/2013 | Hoppe | F02C 7/32 |
| | | | 60/39.15 |
| 2015/0367927 A1 | 12/2015 | Salter | |
| 2017/0305256 A1 | 10/2017 | Bergquist et al. | |
| 2018/0283220 A1 | 10/2018 | Duce et al. | |
| 2019/0085714 A1* | 3/2019 | Zatorski | B64D 27/10 |
| 2019/0085715 A1* | 3/2019 | van der Merwe | H02K 7/1823 |
| 2019/0264800 A1* | 8/2019 | Fisher | F02C 7/06 |
| 2020/0124139 A1* | 4/2020 | Harvey | F16H 1/28 |
| 2020/0340406 A1* | 10/2020 | Maljean | H02K 7/116 |
| 2021/0215059 A1* | 7/2021 | Niepceron | F01D 15/12 |
| 2021/0348566 A1* | 11/2021 | Nowakowski | F02C 7/06 |

\* cited by examiner

HYBRID TRANSMISSION ON PROPELLER GEARBOX

The present application claims the benefit of Italian Patent Application No. 102020000002695, filed on Feb. 11, 2020, which is hereby incorporated by reference herein in its entirety.

FIELD OF THE DISCLOSURE

The present subject matter relates generally to a gearbox assembly for a gas turbine engine having an electric motor integrated therein.

BACKGROUND OF THE DISCLOSURE

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Typically, a high pressure turbine of the turbine section drives a high pressure compressor through a high pressure shaft, and a low pressure turbine drives a low pressure compressor through a low pressure shaft. The fan section may also be driven by the low pressure shaft. In this flow path transmission scheme can be added an electric motor, mechanically connected to the engine shaft aft of the turbine section. The electric machine may add hybrid functions to the gas turbine engine.

In certain operations, the electric machine may be operated in a generator mode whereby the electric machine produces electric energy to be stored in battery. In certain other operations, the electric machine may be operated in a motor mode to add mechanical torque at the engine shaft. Further, in still other operations, the electric machine may be operated in an auxiliary mode defined to add special function mode, e.g., as an ETS (Engine Turning System).

However, an electric machine coupled to the engine shaft may not operate as desired across all operation modes. Accordingly, assemblies for providing improved operations would be useful.

BRIEF DESCRIPTION OF THE DISCLOSURE

Aspects and advantages of the invention will be set forth in part in the following description, or may be obvious from the description, or may be learned through practice of the invention.

In one exemplary embodiment of the present disclosure a gearbox assembly for a gas turbine engine is provided. The gearbox assembly includes: a planetary gear set comprising a sun gear, a planet gear, and a ring gear, the sun gear configured for connection to a first drive shaft of the gas turbine engine and the ring gear configured for connection to a second drive shaft of the gas turbine engine; and an electric machine assembly comprising an input and an electric machine, the electric machine comprising a rotor coupled to the input and a stator fixedly positioned within the gearbox assembly, the input of the electric machine assembly coupled to one of the sun gear, the ring gear, or the planet gear of the planetary gear set.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
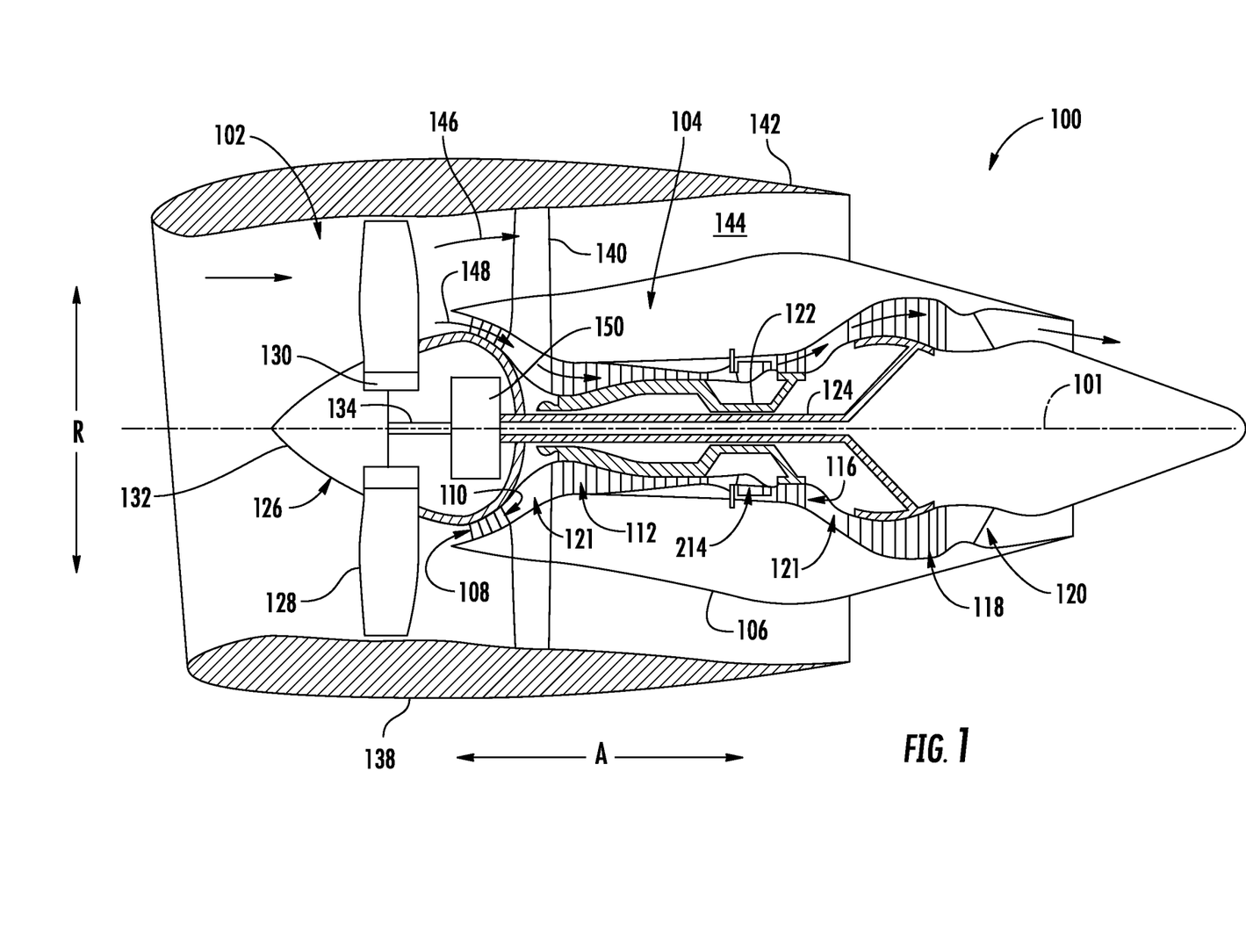
FIG. 1 is a schematic, cross-sectional view of a gas turbine engine in accordance with an exemplary aspect of the present disclosure.

Referring now to the drawings, wherein identical numerals indicate the same elements throughout the figures, FIG. 1 provides a schematic cross-sectional view of a propulsion engine in accordance with an exemplary embodiment of the present disclosure. In certain exemplary embodiments, the propulsion engine may be configured a turbofan jet engine 100, herein referred to as "turbofan 100." As shown in FIG. 1, the turbofan 100 defines an axial direction A (extending parallel to a longitudinal centerline 101 provided for reference), a radial direction R, and a circumferential direction C (extending about the axial direction A; not shown). In general, the turbofan 100 includes a fan section 102 and a core turbine engine 104 disposed downstream from the fan section 102.

The exemplary core turbine engine 104 depicted generally includes a substantially tubular outer casing 106 that defines an annular inlet 108. The outer casing 106 encases, in serial flow relationship, a compressor section including a second, booster or low pressure (LP) compressor 110 and a first, high pressure (HP) compressor 112; a combustion section 114; a turbine section including a first, high pressure (HP) turbine 116 and a second, low pressure (LP) turbine 118; and a jet exhaust nozzle section 110. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A first, high pressure (HP) shaft or spool 122 drivingly connects the HP turbine 116 to the HP compressor 112. A second, low pressure (LP) shaft or spool 124 drivingly connects the LP turbine 118 to the LP compressor 110. Accordingly, the LP spool 124 is rotatable with the LP turbine 118 and the HP spool 122 is rotatable with the HP turbine 116.

For the embodiment depicted, the fan section 102 includes a fan 126 having a plurality of fan blades 128 coupled to a disk 130 in a spaced apart manner. As depicted, the fan blades 128 extend outwardly from disk 130 generally along the radial direction R. In certain exemplary embodiments, the fan 126 may be a variable pitch fan, or alternatively, the fan 126 may be a fixed-pitch fan. The fan blades 128 and disk 130 are together rotatable about the longitudinal axis 101 with a fan shaft 134 of the fan section 102, and more particularly, for the embodiment depicted, are rotatable about the longitudinal axis 101 by the fan shaft 134.

Referring still to the exemplary embodiment of FIG. 1, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween. Notably, it will be appreciated that the turbofan engine 100 defines a bypass ratio.

Referring still to FIG. 1, the fan 126 is rotatable by the LP shaft 124 across a gearbox assembly 150. As will be described in more detail below, the gearbox assembly 150 includes a planetary gear set for stepping down a rotational speed of the LP shaft 124 to a more efficient rotational fan speed. In addition, the exemplary gearbox assembly 150 includes an electric machine assembly operable with the planetary gear set.

It should be appreciated, however, that the exemplary turbofan engine 100 depicted in FIG. 1 is provided by way of example only, and that in other exemplary embodiments, the turbofan engine 100 may have any other suitable configuration. For example, in other exemplary embodiments, the turbofan engine 100 may instead be configured as an unducted turbofan engine, or as noted above, may include a variable pitch fan 126. Further, the exemplary turbine of an engine 100 may include any other suitable number and/or configuration of compressors, turbines, shafts/spools, etc. Further, although depicted as a turbine fan engine 100, in other embodiments, the turbine fan engine 100 may be configured as any other suitable gas turbine engine, such as a turboshaft engine, a turbojet engine, a turboprop engine, etc. Further, still, in other embodiments, the gas turbine engine may not be an aeronautical gas turbine engine, and instead may be configured as, e.g., an aeroderivative gas turbine engine, a power generation gas turbine engine, etc.

Figure 2:
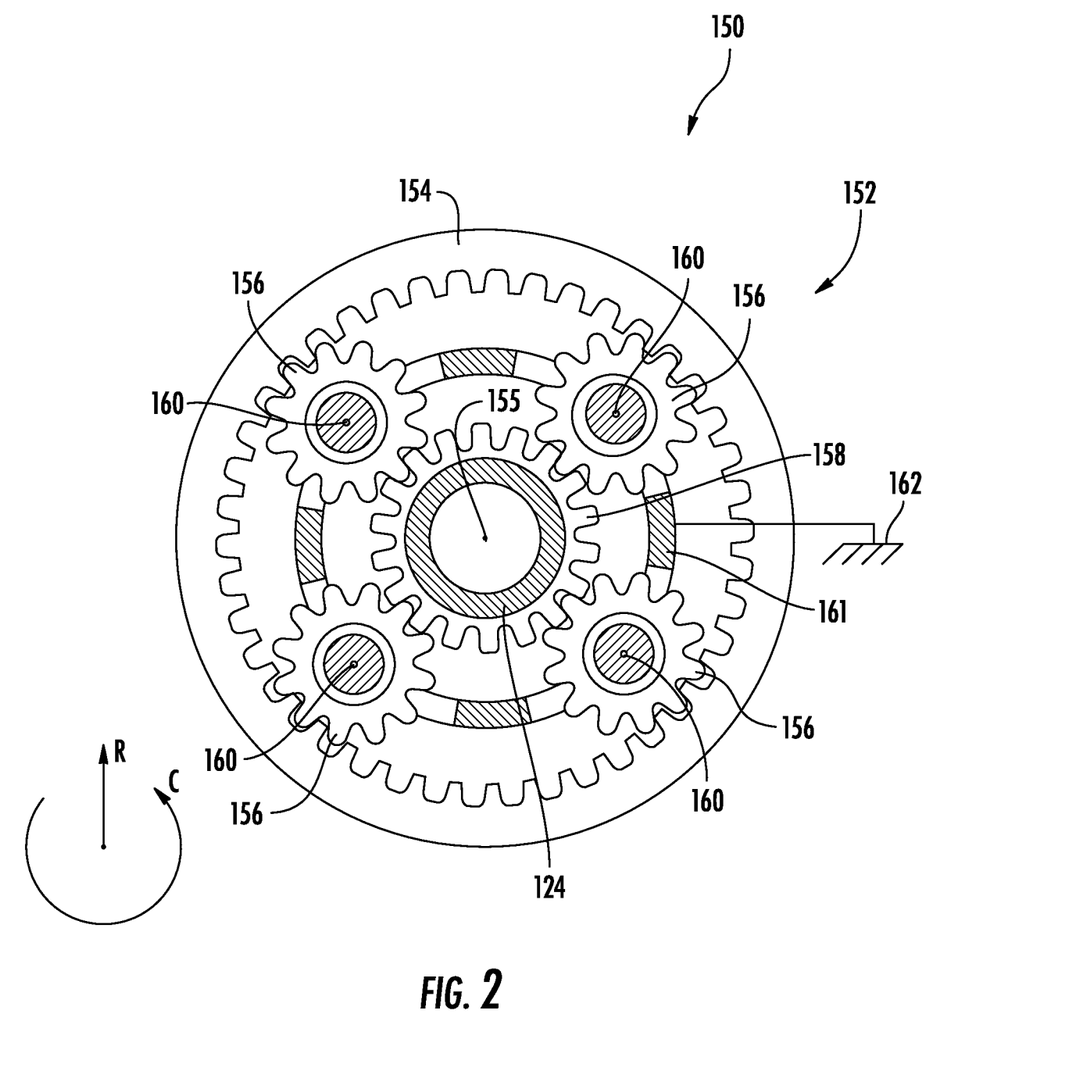
FIG. 2 is a schematic, cross-sectional view of a planetary gearbox assembly in accordance with an exemplary aspect of the present disclosure as may be incorporated into a torque flow path of an engine.

Referring now to FIG. 2, a close-up, schematic view of a gearbox assembly 150 in accordance with an exemplary embodiment of the present disclosure is provided. The gearbox assembly 150 may be incorporated into the turbofan engine 100 described above with reference to FIG. 1, or alternatively may be integrated into any other suitable gas turbine engine (e.g., a turboprop engine, an unducted turbofan engine, etc., such as one or more of the engines described below with reference to FIGS. 6 through 9). As with the embodiment of FIG. 1, the exemplary gearbox assembly 150 of FIG. 2 includes a planetary gear set 152. Although out of view in FIG. 2, the exemplary gearbox assembly 150 further includes an electric machine assembly operable therewith (see embodiments of FIGS. 3 through 5, discussed below).

For this embodiment, the planetary gear set 152 includes a ring gear 154, one or more planet gears 156, and a sun gear 158. The gearbox assembly 150 defines a central axis 155, a radial direction R relative to the central axis 155, and a circumferential direction C extending about the central axis 155. For the embodiment shown, the radial direction R and circumferential direction C the same as the radial direction R and circumferential direction of the exemplary turbine engine 100 of FIG. 1.

The sun gear 158 is attached to and rotatable with the LP spool 124, such that the sun gear 158 is rotatable by the LP turbine 118 and LP spool 124 about the central axis 155 of the gearbox assembly 150. Additionally, for the embodiment depicted, the planetary gear set 152 includes a plurality of planet gears 156 engaged between the sun gear 158 and the ring gear 154. Specifically, for the embodiment depicted, the planetary gear set 152 includes four planet gears 156 engaged between the sun gear 158 and the ring gear 154. However, in other embodiments, the planetary gear set 152 may include any other suitable number of planet gears 156, such as three planet gears 156, five planet gears 156, six planet gears 156, etc.

Each of the plurality of planet gears 156 are rotatable about a respective planet gear axis 160, and are rotatably attached to a planet gear carrier 161. Moreover, each of the exemplary planet gears 156 are single gears (i.e., the planetary gear set 152 is configured as a single-stage gearbox). It should be appreciated, however, that in other embodiments, the one or more planet gears 156 may instead be configured as compound gears defining any suitable gear ratio (see, e.g., the embodiment of FIG. 3, discussed below). For example, the compound gear may include two or more geared portions rotating together on a common gearshaft and meshing with respective mating gears at different axial positions (such that, e.g., the planetary gear set 152 defines multiple "stages", as compared to the single-stage arrangement depicted). Additionally, the planet gear carrier 161 is, for the embodiment depicted, a fixed planet gear carrier 161 connected to a grounded structure 162 of the gas turbine engine. For example, the planet gear carrier 161 may be attached to a gearbox assembly casing (see embodiment of FIG. 3, discussed below).

Figure 3:
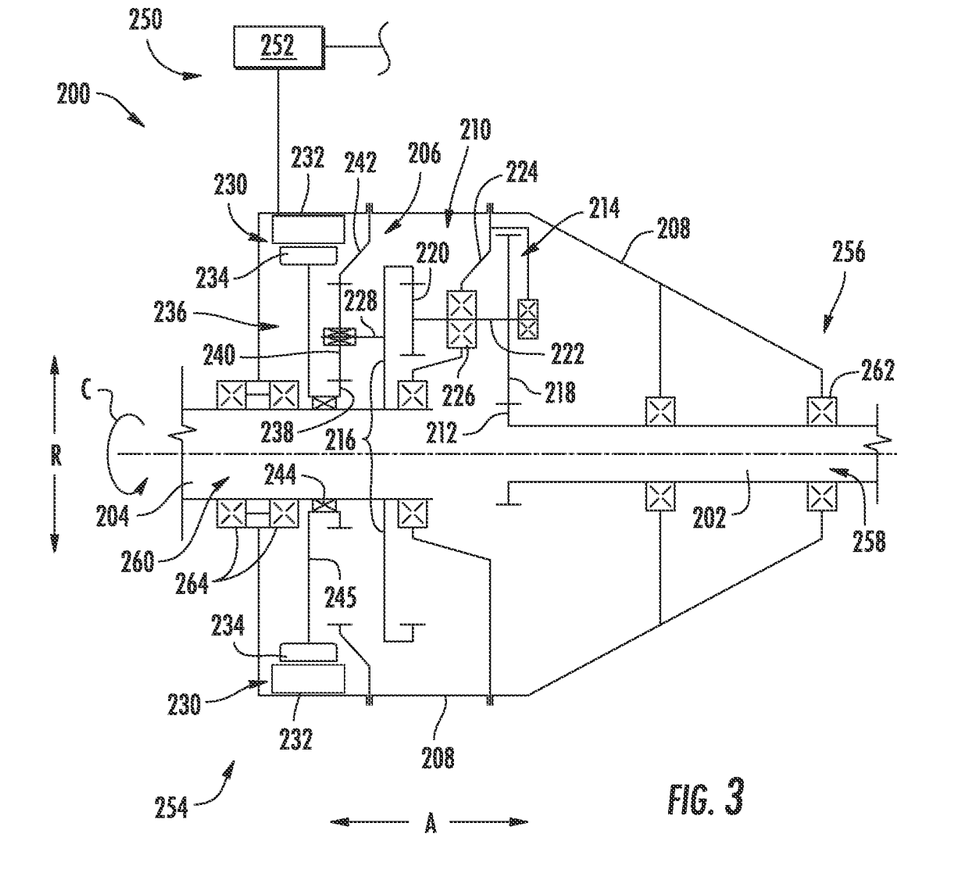
FIG. 3 is a schematic, cross-sectional view of a gearbox assembly in accordance with another exemplary aspect of the present disclosure.

Referring now to FIG. 3, a gearbox assembly 200 for a gas turbine engine in accordance with an exemplary embodiment of the present disclosure is provided. The exemplary gearbox assembly 200 may be incorporated into the exemplary turbofan engine 100 discussed above with reference to FIG. 1 (e.g., as gearbox assembly 150), or alternatively, may be incorporated into any other suitable gas turbine engine (e.g., a differently configured turbofan engine, a turboshaft engine, a turboprop engine, a turbojet engine, etc.), any other suitable combustion engine utilizing the gearbox, etc.

Accordingly, the gas turbine engine (or other engine) within which the gearbox assembly 200 is installed may generally include a first driveshaft 202 and a second driveshaft 204. The first driveshaft 202 may drive the second driveshaft 204 across the gearbox assembly 200. For example, when incorporated into the exemplary turbofan engine 100 of FIG. 1, the first driveshaft 202 may be the LP shaft 124 and the second driveshaft 204 may be the fan shaft 134. However, when incorporated into other engines, the first and second driveshafts 202, 204 may instead be configured as any other suitable shafts.

The exemplary gearbox assembly 200 generally includes a planetary gear set, an electric machine assembly 206, and a gearbox assembly casing 208. For the embodiment shown, the planetary gear set is more specifically, a first planetary gear set 210, and the gearbox assembly casing 208 substantially completely encloses both the first planetary gear set 210 and the electric machine assembly 206.

The first planetary gear set 210 may be configured in a similar manner to the exemplary planetary gear set 152 discussed above with reference to FIG. 2. For example, the first planetary gear set 210 includes a first sun gear 212, a first planet gear 214, and a first ring gear 216. The first sun gear 212 is configured for connection to the first driveshaft 202 of the engine, and the first ring gear 216 is configured for connection to the second driveshaft 204 of the engine. More specifically, as is depicted in FIG. 3, for the embodiment shown, the first sun gear 212 is fixedly coupled to the first driveshaft 202 and the first ring gear 216 is fixedly coupled to the second driveshaft 204. In such a manner, the first sun gear 212 and first driveshaft 202 are configured to rotate together and the first ring gear 216 and second driveshaft 204 are configured to rotate together.

Moreover, as will be appreciated for the embodiment shown, the first planet gear 214 is a compound planet gear. As such, the first planet gear 214 includes a first stage 218 directly engaged with the first sun gear 212 and a second stage 220 directly engaged with the first ring gear 216. The first stage 218 and the second stage 220 of the first planet gear 214 are fixedly coupled to one another through a planet gear shaft 222. Notably, however, in other exemplary aspects, the first planet gear 214 may not be a compound planet gear and accordingly may only include one stage.

Also for the embodiment shown, the first planetary gear set 210 further includes a first planet gear carrier 224. The first planet gear 214 is rotatably coupled to the first planet gear carrier 224, and more specifically for the embodiment shown, the planet gear shaft 222 is rotatably coupled to the first planet gear carrier 224 through a planet gear bearing set 226. Inclusion of a compound planet gear may allow for further modification of an overall gear ratio of the first planetary gear set 210. Although a single first planet gear 214 is shown in the schematic view of the embodiment of FIG. 3, it will be appreciated that the first planetary gear set 210 may include any suitable number of first planet gears 214 (such as four first planet gears 214, as in the embodiment of FIG. 2, or alternatively, three first planet gears 214, five first planet gears 214, etc.).

Briefly, it will be appreciated that for the embodiment shown, the first planet gear carrier 224 is fixedly positioned within the gearbox assembly 200. More specifically, for the embodiment shown, the first planet gear carrier 224 is fixedly coupled to the gearbox assembly casing 208 of the gearbox assembly 200. As such, the first planet gear 214 of the first planetary gear set 210 may not be configured to rotate in the circumferential direction C.

As will be appreciated from the above description, the first driveshaft 202 of the gas turbine engine is configured to drive the second driveshaft 204 of the gas turbine engine across the first planetary gear set 210. More particularly, for the embodiment shown, the first driveshaft 202 is fixedly coupled to the first sun gear 212; the first sun gear 212 is directly engaged with the first stage 218 of the first planet gear 214; the first stage 218 of the first planet gear 214 is fixed to the second stage 220 of the first planet gear 214 across the planet gear shaft 222; the second stage 220 of the first planet gear 214 is directly engaged with the first ring gear 216; and the first ring gear 216 is fixedly coupled to the second driveshaft 204. It will be appreciated that the "directly engaged" components/gears are shown schematically as an axial line in FIG. 3. In at least certain embodiments, the gears may be directly engaged through corresponding gear teeth meshing with one another to transfer torque (see, e.g., FIG. 2).

Moreover, as noted above, the gearbox assembly 200 includes the electric machine assembly 206. The electric machine assembly 206 includes an input 228 and an electric machine 230. The input 228 of the electric machine assembly 206 is coupled to a rotating component of the first planetary gear set 210, such as to one of the first ring gear 216, the sun gear 212, or the first planet gear 214 of the first planetary gear set 210. More specifically, for the embodiment shown, the input 228 is coupled to the first ring gear 216, as the first ring gear 216 is configured to rotate.

However, in other exemplary embodiments, the first ring gear 216 may be fixedly positioned within the gearbox assembly casing 208, and the input 228 may instead be coupled to the first planet gear 214 via, e.g., the first planet gear carrier 224.

Referring still to FIG. 3, the input 228 may be any suitable mechanical connector, such as a rod, plate, or other rigid or substantially rigid geometry coupled to, or otherwise extending from (e.g., formed integrally with) the first ring gear 216 of the first planetary gear set 210.

Additionally, the electric machine 230 generally includes a stator 232 and a rotor 234. The stator 232 is fixedly positioned to the gearbox assembly 200, and more specifically is fixedly positioned within the gearbox assembly 200, and more specifically still, is fixedly mounted to the gearbox assembly casing 208 for the embodiment shown. Further, the rotor 234 is coupled to the input 228 of the electric machine assembly 206. As such, the rotor 234 may be rotatable by the first ring gear 216 of the first planetary gear set 210, or alternatively may add power to the first ring gear 216 of the first planetary gear set 210.

The electric machine 230 may have any suitable configuration. For example, the electric machine 230 may be configured in any suitable manner for converting mechanical power to electrical power, or electrical power to mechanical power. For example, the electric machine 230 may be configured as an asynchronous or induction electric machine operable to generate or utilize alternating current (AC) electric power. Alternatively, the electric machine 230 may be configured as a synchronous electric machine operable to generate or utilize AC electric power or direct current (DC) electric power. In such a manner it will be appreciated that the stator 232, the rotor 234, or both may generally include one or more of a plurality of coils or winding arranged in any suitable number of phases, one or more permanent magnets, one or more electromagnets, etc.

Moreover, as noted, the rotor 234 is coupled to the input 228 of the electric machine assembly 206 and, as such, is rotatable with the ring gear of the first planetary gear set 210.

More specifically, for the embodiment shown, the electric machine assembly 206 further includes a second gear set, with the electric machine 230 being coupled to the input 228 across the second gear set. More specifically, still, the second gear set is a second planetary gear set 236, and the electric machine 230 is coupled to the input 228 across the second planetary gear set 236. Inclusion of the second planetary gear set 236 may allow for the electric machine 230 to be rotated at a desired operational speed despite a desired rotational speed of the first and/or second drive shafts 202, 204. However, in other embodiments, the second gear set may not be a planetary gear set, and may instead have any other suitable gearing configuration. Alternatively still, the rotor 234 of the electric machine 230 may be driven by the input 228 in any other suitable manner, such as through a direct mechanical connection.

Referring still to the exemplary embodiment depicted in FIG. 3, the second planetary gear set 236 includes a second sun gear 238, a second planet gear 240, and a second ring gear 242. The input 228 of the electric machine assembly 206 is coupled to the second planet gear 240 of the second planetary gear set 236, extending between the first ring gear 216 and the second planet gear 240.

Moreover, for the embodiment shown, the second ring gear 242 is fixedly positioned within the gearbox assembly 200, and more specifically, is fixedly mounted to the gearbox assembly casing 208. Also, for the embodiment shown, the rotor 234 of the electric machine 230 of the electric machine assembly 206 is coupled to the second sun gear 238 of the second planetary gear set 236. More specifically, the second sun gear 238 is coupled to an extension web 245 extending to the rotor 234 of the electric machine 230, mechanically coupling the second sun gear 238 to the rotor 234 of the electric machine 230. Further, for the embodiment shown, the second sun gear 238 and extension web 245 are supported by the second driveshaft 204 (or vise versa) through a differential bearing assembly 244.

However, in other embodiments, the second sun gear 238 may be coupled to the rotor 234 of the electric machine 230 through any other suitable structure. Further, in other exemplary embodiments, the rotor 234 of the electric machine 230 may be coupled to the input 228 through any other configuration of second planetary gear set 236 configuration (e.g., coupled to the second ring gear 242, with the sun gear being fixedly positioned within the gearbox assembly 200). Further, still, although the exemplary stator 232 of the exemplary electric machine 230 is shown positioned within the gearbox assembly casing 106, in other exemplary embodiments the stator 232 may be fixedly positioned to the gearbox assembly by being fixed directly or indirectly to the casing 106, within the casing 106 or exterior to the casing 106.

Accordingly, in operation, the second planet gear 240 directly engages with both the second ring gear 242 and the second sun gear 238. Given that the second ring gear 242 is fixedly positioned within the gearbox assembly 200 for the embodiment shown, the second planet gear 240 may rotate with the first ring gear 216, allowing power to be transferred between the electric machine 230 and first ring gear 216.

Briefly, as is depicted schematically, the electric machine 230 is electrically coupled to a power bus 250. The power bus 250 may be a power bus of the gas turbine engine including the gearbox assembly 200, of an aircraft incorporating the gas turbine engine, or both. The power bus 250 depicted includes one or more electrical power storage devices, such as a battery pack 252. The power bus 250 may transfer electrical power between the electric machine 230 and the battery pack 252 based on an operating condition of the engine, electrical power needs of the gas turbine engine or aircraft, mechanical power needs of the gas turbine engine, etc.

It will be appreciated that in certain exemplary embodiments, the electric machine 230 may be operated as an electric generator, such that mechanical power may be transferred from the first ring gear 216, through the second planetary gear set 236, to the rotor 234 of the electric machine 230, with the electric machine 230 converting such mechanical power to electrical power. The electric machine 230 may further transfer such electric power 230 to the power bus 250 (e.g., to charge the battery pack 252, or for any other suitable purpose). It will further be appreciated that in other exemplary aspects, however, the electric machine 230 may be operated as an electric motor, converting electrical power to mechanical power, rotating the rotor 234 of the electric machine 230 in the circumferential direction C and driving the first ring gear 216 across the second planetary gear set 236. In such a manner, the electric machine 230 of the electric machine assembly 206 may rotate the second driveshaft 204, the first driveshaft 202, or both. The electric machine 230 may receive electrical power from the power bus 250 during such operations, such as from the battery pack 252 or other suitable electrical power source.

Referring still to the exemplary electric machine 230 depicted in FIG. 3, it will be appreciated that the rotor 234 is located inward of the stator 232 (e.g., in an "in-runner" configuration), and the rotor 234 and stator 232 are configured as a radial flux electric machine 230 (i.e., arranged/spaced generally along the radial direction R). It will be appreciated, however, that in other exemplary embodiments, the electric machine 230 may have any other suitable configuration. For example, referring briefly to FIGS. 4 and 5, electric machines 230 of the respective electric machine assemblies 206 of respective gearbox assemblies 200 in accordance with other exemplary aspects of the present disclosure are provided. The gearbox assemblies 200 of FIGS. 4 and 5 may be configured in a similar manner to the exemplary gearbox assembly 200 of FIG. 3. As such, it will be appreciated that the same numbers refer to the same parts.

Figure 4:
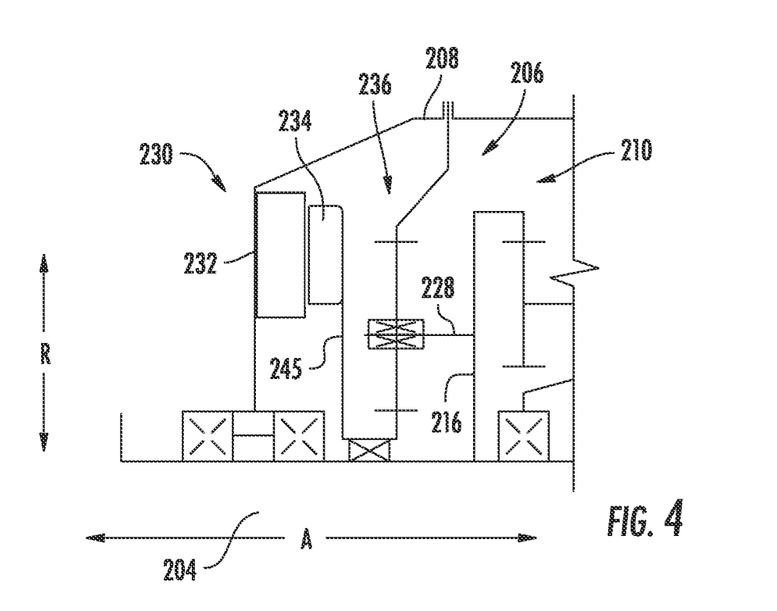
FIG. 4 is a schematic, cross-sectional view of a gearbox assembly in accordance with yet another exemplary aspect of the present disclosure.

Referring particularly to FIG. 4, the electric machine 230 includes a rotor 234 and a stator 232. However, by contrast to the exemplary radial flux electric machine 230 depicted in FIG. 3, the exemplary electric machine 230 of FIG. 4 is configured as an axial flux electric machine. With such a configuration, the rotor 234 and stator 232 are arranged along the axial direction A of the gearbox assembly 200, and more specifically, are spaced from one another along the axial direction A.

Figure 5:
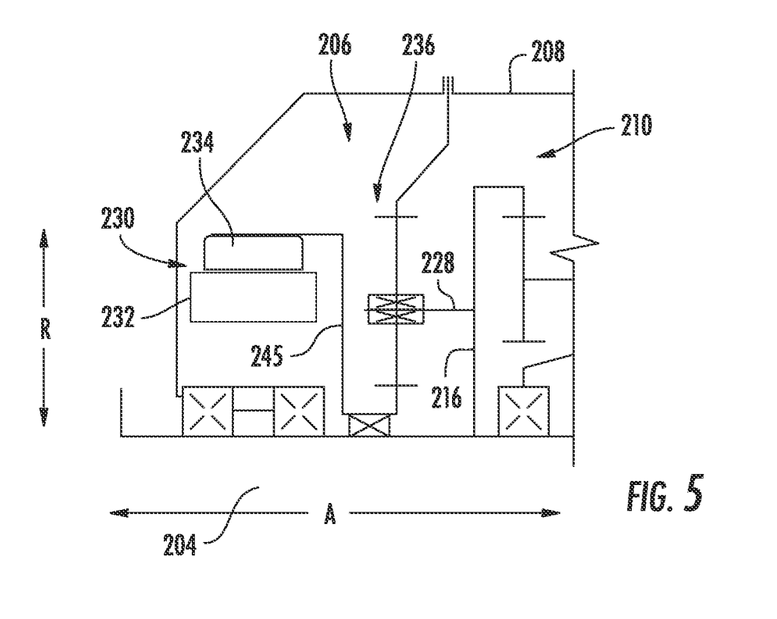
FIG. 5 is a schematic, cross-sectional view of a gearbox assembly in accordance with still another exemplary aspect of the present disclosure.

Referring particularly to FIG. 5, the electric machine 230 again includes a rotor 234 and a stator 232. However, by contrast to the exemplary in-runner electric machine 230 of FIG. 3, the exemplary electric machine 230 of FIG. 5 is configured as an "out-runner" electric machine. More specifically, for the electric machine 230 of FIG. 5, the rotor 234 is positioned outward from the stator 232 along the radial direction R of the gearbox assembly 200.

Referring now back to FIG. 3, as noted above, the gearbox assembly 200 further includes the gearbox assembly casing 208. For the embodiment shown, the gearbox assembly casing 208 extends generally between a forward end 254 and an aft end 256, and substantially completely encloses both the first planetary gear set 210 and the electric machine assembly 206 (i.e., encloses all the moving and/or meshing components of the first planetary gear set 210 and the electric machine assembly 206), or more particularly completely encloses both the first planetary gear set 210 and the electric machine assembly 206 for the embodiment shown. The gearbox assembly casing 208, for the embodiment shown further defines a first opening 258 at the aft end 256 for receipt of the first driveshaft 202 of the gas turbine engine, as well as a second opening 260 at the forward end 254 for receipt of the second driveshaft 204 of the gas turbine engine. Moreover, the exemplary gearbox assembly 200 depicted includes a first bearing assembly 262 located at the aft end 256 for rotatably mounting the gearbox assembly casing 208 to the first driveshaft 202 of the gas turbine engine at the aft end 256 of the gearbox assembly casing 208. Similarly, the exemplary gearbox assembly 200 depicted includes a second bearing assembly 264 located at the forward end 254 for rotatably mounting the gearbox assembly casing 208 to the second driveshaft 204 of the gas turbine engine at the forward end 254 of the gearbox assembly casing 208.

Although not depicted, the gearbox assembly 200 may further include one or more lubrication oil assemblies for providing lubrication oil to the first planetary gear set 210, the second planetary gear set 236, or both. Further, the gearbox assembly 200 may include one or more cooling features for maintaining a temperature of the first planetary gear set 210, the electric machine assembly 206, or both within a desired operating temperature ranges.

Inclusion of a gearbox assembly with a gas turbine engine having an electric machine assembly operable with the first planetary gear set in accordance with one or more of the exemplary aspects described above may facilitate additional power extraction from the gas turbine engine to provide the aircraft with a desired amount of electrical power. Additionally, or alternatively, inclusion of a gearbox assembly with the gas turbine engine having an electric machine assembly operable with the first planetary gear set in accordance with one or more of the exemplary aspects described above may allow for the electric machine assembly to add power to one or more aspects of the gas turbine engine, such as a first driveshaft, a second driveshaft, or both, during certain operations.

As noted above, in other exemplary embodiments, the gearbox assembly 200 may be incorporated into, or otherwise utilized with, any other suitable engine and/or propulsion assembly. For example, referring now to FIGS. 6 through 9, various additional embodiments of the present disclosure are depicted wherein a gearbox assembly 200 of the present disclosure is utilized with various other gas turbine engines and/or propulsion assemblies.

Figure 6:
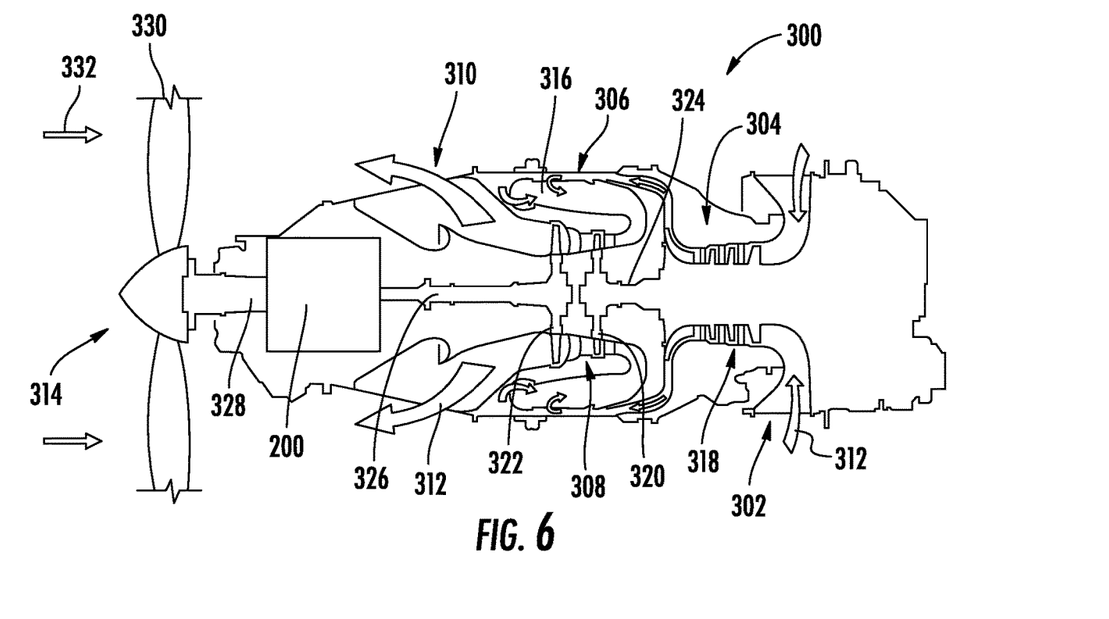
FIG. 6 is a schematic view of a turboprop engine in accordance with an exemplary aspect of the present disclosure incorporating a gearbox assembly in accordance with an exemplary embodiment of the present disclosure.

For example, referring first to FIG. 6, the gearbox assembly 200 is depicted incorporated into a turboprop engine 300. The turboprop engine 300 includes an inlet 302, a compressor section 304, a combustion section 306, a turbine section 308, and an exhaust 310 in serial flow order having a turbomachine airflow (indicated by arrows 312), as well as a propeller assembly 314. The combustion section 306 includes a reverse flow combustor 316. The compressor section 304 includes a first compressor 318 and the turbine section 308 includes a first turbine 320 and a second turbine 322. The first turbine 320 is coupled to the first compressor 318 though a first shaft 324 and the second turbine is coupled to the propeller assembly 314 through a second shaft 326. More specifically, the second shaft 326 is coupled to the propeller assembly 314 across a gearbox assembly 200 in accordance with an exemplary embodiment of the present disclosure, configured such that the propeller assembly 314 is arranged in line with the turbomachinery components (e.g., the compressor section 304, combustion section 306, and turbine section 308). Accordingly, the gearbox assembly 200 may generally include an electric machine incorporated therein, as discussed above.

As will be appreciated, the propeller assembly 314 generally includes a propeller shaft 326 328, driven by the second shaft 326 across the gearbox assembly 200, and a plurality of propellers 330 driven by the propeller shaft 326 328. The plurality of propellers 330 accelerate an ambient airflow 332 to generate thrust. Accordingly, it will be appreciated that the exemplary turboprop engine 300 depicted is in a "pulled" configuration.

Figure 7:
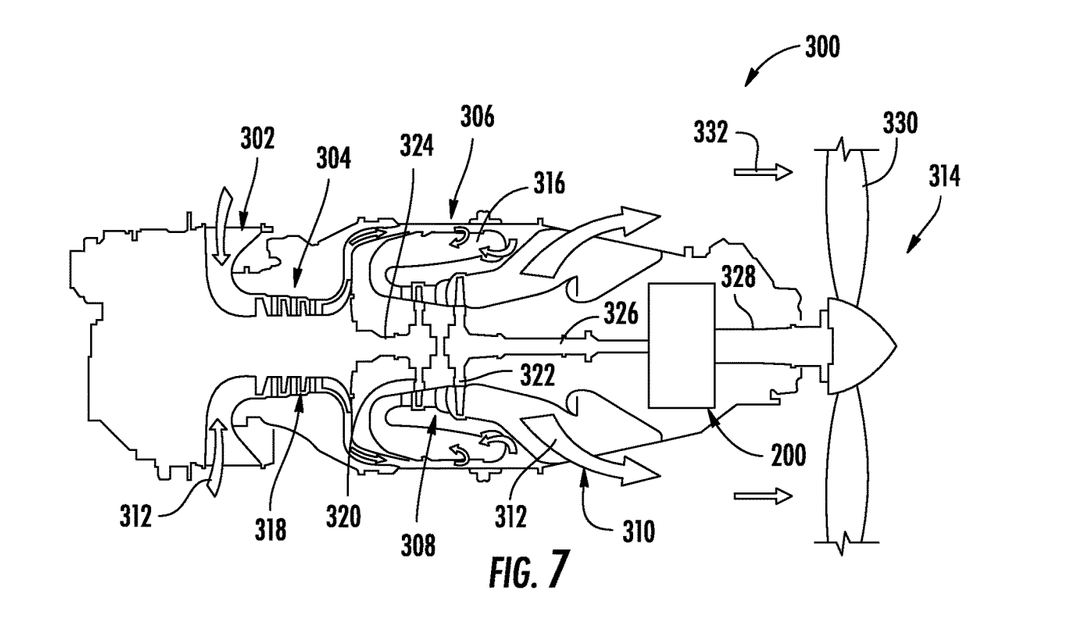
FIG. 7 is a schematic view of a turboprop engine in accordance with another exemplary aspect of the present disclosure incorporating a gearbox assembly in accordance with an exemplary embodiment of the present disclosure.

Referring now to FIG. 7, the gearbox assembly 200 is depicted incorporated into a turboprop engine 300 in accordance with another embodiment. More specifically, the turboprop engine 300 depicted in FIG. 7 similarly includes an inlet 302, a compressor section 304, a combustion section 306, a turbine section 308, and an exhaust 310 in serial flow order having a turbomachine airflow (indicated by arrows 312), as well as a propeller assembly 314. The propeller assembly 314 is driven by a second shaft 326 of the turboprop engine 300 across a gearbox assembly 200 configured in accordance with an embodiment of the present disclosure.

However, for the embodiment depicted, the inlet 302 of the turbomachinery is provided at a forward end of the turboprop engine 300, the exhaust 310 of the turboprop engine 300 is provided at an aft end of the turboprop engine 300, and the propeller assembly 314 is also provided at the aft end of the turboprop engine 300. Accordingly, the exemplary turboprop engine 300 depicted in FIG. 7 may be referred to as a reverse flow, in line, propeller pushed turboprop engine.

Figure 8:
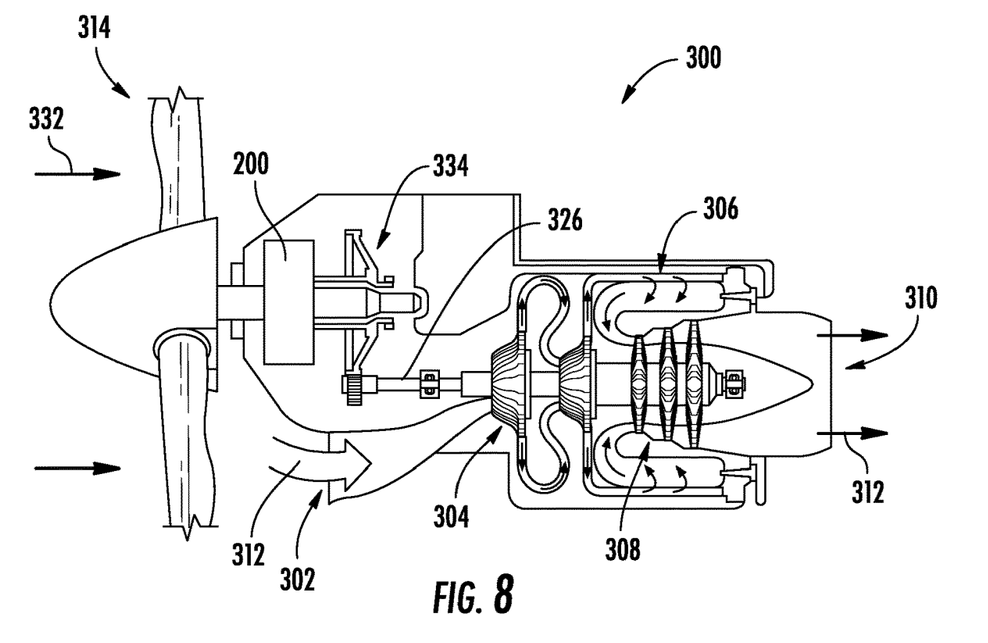
FIG. 8 is a schematic view of a turboprop engine in accordance with yet another exemplary aspect of the present disclosure incorporating a gearbox assembly in accordance with an exemplary embodiment of the present disclosure.

Referring now to FIG. 8, the gearbox assembly 200 is depicted incorporated into a turboprop engine 300 in accordance with yet another exemplary embodiment of the present disclosure. The exemplary turboprop engine 300 depicted in FIG. 8 similarly includes an inlet 302, a compressor section 304, a combustion section 306, a turbine section 308, and an exhaust 310 in serial flow order having a turbomachine airflow (indicated by arrows 312), as well as a propeller assembly 314. The propeller assembly 314 is driven by a shaft 326 of the turboprop engine 300 across the gearbox assembly 200 in accordance with an embodiment of the present disclosure.

However, for the embodiment depicted, the propeller assembly 314 is not in line with the turbomachinery, and instead is offset from the turbomachinery using an offset gear assembly 334. The offset gear assembly 334 transfers rotational energy from the engine shaft 326 rotatable with the turbomachinery to the propeller assembly 314. More specifically, the offset gear assembly 334 is operable with the gearbox assembly 200 in accordance with an embodiment of the present disclosure, such that the engine shaft 326 rotates the propeller assembly 314 across the offset gear assembly 334 and the gearbox assembly 200 in accordance with an embodiment of the present disclosure.

Figure 9:
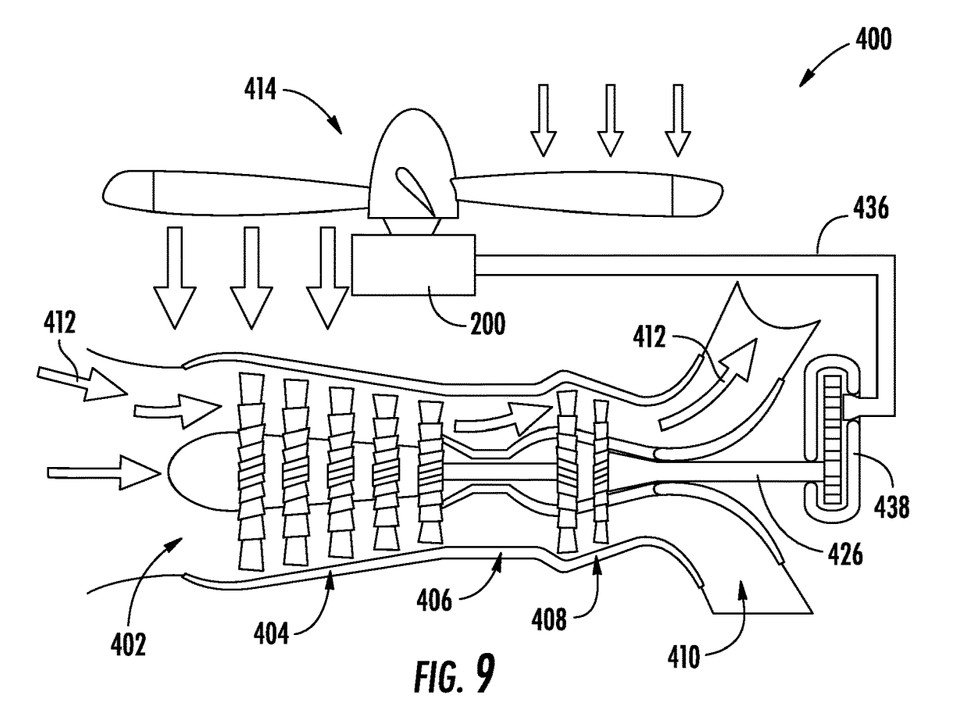
FIG. 9 is a schematic view of a turboshaft engine in accordance with an exemplary aspect of the present disclosure incorporating a gearbox assembly in accordance with an exemplary embodiment of the present disclosure.

Referring now to FIG. 9, the gearbox assembly 200 is depicted incorporated into a gas turbine engine in accordance with yet another exemplary embodiment of the present disclosure. More specifically, for the embodiment of FIG. 9, the gas turbine engine is a turboshaft engine 400. The exemplary turboshaft engine 400 depicted in FIG. 9 is configured in a similar manner as the exemplary turboprop engines 300 of FIGS. 6 through 8, and accordingly includes an inlet 402, a compressor section 404, a combustion section 406, a turbine section 408, and an exhaust 410 in serial flow order having a turbomachine airflow (indicated by arrows 412), as well as a propeller assembly 414. The propeller assembly 414 is driven by a shaft 426 of the turboshaft engine 400 across the gearbox assembly 200 in accordance with an embodiment of the present disclosure.

However, for the embodiment depicted, the propeller assembly 314 is remote from the turboshaft engine 400, such as may be incorporated into a helicopter. With such a configuration, an engine shaft 326 of the turboshaft engine 400 may rotate one or more connection shafts 436 and one or more connection gear assemblies 438, with the one or more connection shafts 436 and one or more connection gear assemblies 438 in turn rotating the propeller assembly 414. More specifically, for the embodiment shown, the engine shaft 326 of the turboshaft engine 400 rotates one or more connection shafts 436 and one or more connection gear assemblies 438, with the one or more connection shafts 436 and one or more connection gear assemblies 438 in turn rotating the propeller assembly 414 across the gearbox assembly 200 in accordance with an embodiment of the present disclosure.

It will be appreciated, however, that in still other exemplary embodiments, a gearbox assembly 200 in accordance with an embodiment of the present disclosure may instead be incorporated into any other suitable gas turbine engine and/or drive assembly for a vehicle.

Figure 10:
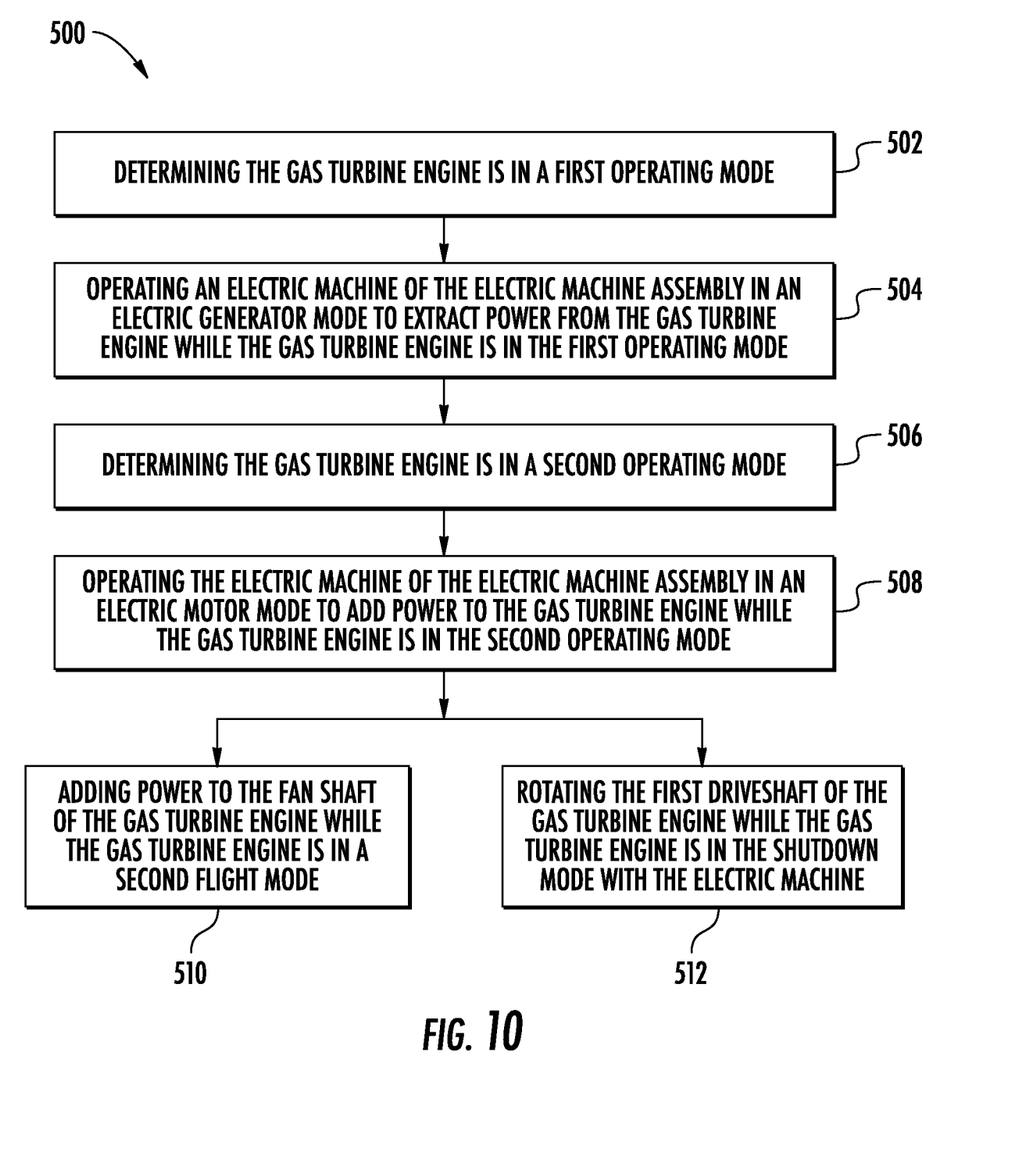
FIG. 10 is a flow diagram of a method for operating a gas turbine engine in accordance with an exemplary aspect of the present disclosure.

Referring now to FIG. 10, a method 300 for operating a gearbox assembly of the gas turbine engine in accordance with an exemplary aspect of the present disclosure is provided. The exemplary method 500 may be utilized with one or more the exemplary gearbox assemblies described above with reference to FIGS. 1 through 9. Accordingly, the gearbox assembly may generally include a planetary gear set and an electric machine assembly. The planetary gear set may include a sun gear, a planet gear, and a ring gear. The sun gear of the planetary gear set may be connected to a first driveshaft of the gas turbine engine and the ring gear of the planetary gear set may be connected to the second driveshaft of the gas turbine engine.

The method 500 generally includes at (502) determining the gas turbine engine is in a first operating mode, and at (504) operating an electric machine of the electric machine assembly in an electric generator mode to extract power from the gas turbine engine while the gas turbine engine is in the first operating mode. In at least certain exemplary aspects, the electric machine assembly may further include an input coupled to one of the ring gear, the sun gear, or the planet gear of the planetary gear set of the gearbox assembly.

The method 500 further includes at (506) determining the gas turbine engine is in a second operating mode, and at (508) operating the electric machine of the electric machine assembly in an electric motor mode to add power to the gas turbine engine while the gas turbine engine is in the second operating mode.

In at least certain exemplary aspects, the first operating mode is a first flight mode and the second operating mode is a second flight mode. For example, the first flight mode and the second flight mode may each be one of, e.g., a takeoff flight mode, a climb flight mode, a cruise flight mode, a step change flight mode, a descent flight mode, etc. The second flight mode may be different from the first flight mode. Further, it will be appreciated that in at least certain exemplary aspects, the second driveshaft of the gas turbine engine may be a fan shaft of the gas turbine engine coupled to, e.g., a fan of the gas turbine engine. With such an exemplary aspect, operating the electric machine of the electric machine assembly in the electric motor mode at (508) may include at (510) adding power to the fan shaft of the gas turbine engine while the gas turbine engine is in a second flight mode, and more specifically, adding power to the fan shaft gas turbine engine with the electric machine.

Alternatively, in other exemplary embodiments, the second operating mode may not be a flight operating mode, and instead may be, e.g., a shutdown mode of the gas turbine engine. The shutdown mode may refer to operations during which the gas turbine engine is being shut off, and/or after the gas turbine engine has been shut off (i.e., after fuel is no longer being provided to the combustion section of the engine to generate combustion gases). With such an exemplary aspect, operating the electric machine of the electric machine assembly in the electric motor mode at (508) may include at (512) rotating the first driveshaft of the gas turbine engine while the gas turbine engine is in the shutdown mode with the electric machine. For example, the first driveshaft of the gas turbine engine may be, e.g., a low pressure shaft of the gas turbine engine. With such an exemplary aspect, rotating the first driveshaft of the gas turbine engine while the gas turbine engine is in the shutdown mode at (508) may include at (514) rotating the low pressure shaft of the gas turbine engine to prevent a rotor bow condition of the low pressure shaft. Rotating the low pressure shaft of the gas turbine engine to prevent a rotor bow condition of the low pressure shaft at (514) may include rotating the low pressure shaft of the gas turbine engine at a rotational speed of less than about 200 revolutions per minute ("rpm"), such as less than about 100 rpm, such as less than about 60 rpm, such as less than about 30 rpm, such as at least about 0.5 rpm.

It will be appreciated, however, that in at least certain exemplary aspects, the method 500 may include operating the electric machine of the electric machine assembly in the electric motor mode when the operating mode of the gas turbine engine is the second flight operating mode and when the operating mode of the gas turbine engine is the shutdown mode. With such an exemplary aspect, determining the gas turbine engine is in the second operating mode at (506) may include determining the gas turbine engine is in the second flight operating mode, operating the electric machine of the electric machine assembly in the electric motor mode at (508) may include adding power to the fan shaft with the electric machine, and the method 500 may further include determining the gas turbine engine is in a third operating mode, with the third operating mode being the shutdown mode of the gas turbine engine (as discussed above), as well as operating the electric machine of the electric machine assembly in the electric motor mode to rotate the first driveshaft of the gas turbine engine while the gas turbine engine is in the shutdown mode (e.g., to prevent a rotor bow condition, also as discussed above).

As such, it will be appreciated that operating a gas turbine engine in accordance with one or more of the exemplary aspects of the present disclosure may allow for a gas turbine engine to utilize an electric machine assembly of an exemplary gearbox assembly to provide a desired amount of electrical power for the gas turbine engine and/or aircraft, to provide a desired amount of thrust for the gas turbine engine, and/or to reduce the likelihood of damage to the gas turbine engine after the gas turbine engine is shut down.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A gearbox assembly for a gas turbine engine including: a planetary gear set comprising a sun gear, a planet gear, and a ring gear, the sun gear configured for connection to a first drive shaft of the gas turbine engine and the ring gear configured for connection to a second drive shaft of the gas turbine engine; and an electric machine assembly comprising an input and an electric machine, the electric machine comprising a rotor coupled to the input and a stator fixedly positioned to the gearbox assembly, the input of the electric machine assembly coupled to one of the sun gear, the ring gear, or the planet gear of the planetary gear set.

The gearbox assembly of any of the preceding clauses, wherein the planetary gear set further comprises a planet gear carrier, wherein the planet gear is rotatably coupled to the planet gear carrier, wherein the planet gear carrier is fixedly positioned within the gearbox assembly, and wherein the input of the electric machine assembly is coupled to the ring gear of the planetary gear set.

The gearbox assembly of any of the preceding clauses, wherein the planetary gear set is a first planetary gear set, wherein the electric machine assembly comprises a second planetary gear set, and wherein the rotor of the electric machine is coupled to the input of the electric machine assembly across the second planetary gear set.

The gearbox assembly of any of the preceding clauses, wherein the sun gear, the planet gear, and the ring gear of the first planetary gear set are configured as a first sun gear, a first planet gear, and a first ring gear, wherein the second planetary gear set comprises a second sun gear, a second planet gear, and a second ring gear, wherein the input of the electric machine assembly is coupled to the second planet gear of the second planetary gear set.

The gearbox assembly of any of the preceding clauses, wherein the rotor of the electric machine of the electric machine assembly is coupled to the second sun gear of the second planetary gear set.

The gearbox assembly of any of the preceding clauses, wherein the second ring gear is fixedly positioned within the gearbox assembly.

The gearbox assembly of any of the preceding clauses, wherein the input of the electric machine assembly is coupled to the ring gear of the planetary gear set, wherein the planet gear of the planetary gear set is a compound planet gear comprising a first stage and a second stage, wherein the first stage is engaged with the sun gear of the planetary gear set, and wherein the second stage is engaged with to the ring gear of the planetary gear set.

The gearbox assembly of any of the preceding clauses, wherein the electric machine is arranged in an axial flux configuration.

The gearbox assembly of any of the preceding clauses, wherein the electric machine is arranged in a radial flux configuration.

The gearbox assembly of any of the preceding clauses, wherein the gearbox assembly defines a radial direction, and wherein the rotor is located inward of the stator along the radial direction.

The gearbox assembly of any of the preceding clauses, wherein the gearbox assembly defines a radial direction, and wherein the rotor is located outward of the stator along the radial direction.

The gearbox assembly of any of the preceding clauses, further comprising: a gearbox assembly casing extending between a forward end and an aft end; a first bearing assembly located at the aft end for rotatably mounting the gearbox assembly casing to the first drive shaft of the gas turbine engine at the aft end of the gearbox assembly casing; and a second bearing assembly located at the forward end for rotatably mounting the gearbox assembly casing to the second drive shaft of the gas turbine engine at the forward end of the gearbox assembly casing.

The gearbox assembly of any of the preceding clauses, further comprising: a gearbox assembly casing, wherein the stator of the electric machine is fixedly within the gearbox assembly casing of the gearbox assembly.

The gearbox assembly of any of the preceding clauses, wherein the input of the electric machine assembly is directly coupled to one of the sun gear, the ring gear, or the planet gear of the planetary gear set.

A gas turbine engine including: a turbomachine comprising a compressor, a combustion section, and a turbine arranged in serial flow order, the turbomachine further comprising an engine shaft rotatable with the turbine; a fan section comprising a fan and a fan shaft, the fan shaft coupled to the fan for driving the fan; and a gearbox assembly comprising: a planetary gear set comprising a sun gear, a planet gear, and a ring gear, the sun gear connected to the engine shaft of the gas turbine engine and the ring gear coupled to the fan shaft; and an electric machine assembly comprising an input and an electric machine, the electric machine comprising a rotor coupled to the input and a stator fixedly positioned to the gearbox assembly, the input of the electric machine assembly coupled to one of the sun gear, the ring gear, or the planet gear of the planetary gear set.

The gas turbine engine of any of the preceding clauses, wherein the planetary gear set further comprises a planet gear carrier, wherein the planet gear is rotatably coupled to the planet gear carrier, wherein the planet gear carrier is fixedly positioned to the gearbox assembly, and wherein the input of the electric machine assembly is coupled to the ring gear of the planetary gear set.

A method for operating a gearbox assembly of the gas turbine engine, the gearbox assembly comprising a planetary gear set and an electric machine assembly, the planetary gear set including a sun gear, a planet gear, and a ring gear, the sun gear connected to a first drive shaft of the gas turbine engine and the ring gear connected to a second drive shaft of the gas turbine engine, the method comprising: determining the gas turbine engine is in a first operating mode; operating an electric machine of the electric machine assembly in an electric generator mode to extract power from the gas turbine engine while the gas turbine engine is in the first operating mode, the electric machine assembly further comprising an input coupled to one of the sun gear, the ring gear, or the planet gear of the planetary gear set; determining the gas turbine engine is in a second operating mode; and operating the electric machine of the electric machine assembly in an electric motor mode to add power to the gas turbine engine while the gas turbine engine is in the second operating mode.

The method of any of the preceding clauses, wherein the first operating mode is a first flight mode, and wherein the second operating mode is a second flight mode.

The method of any of the preceding clauses, wherein the second drive shaft of the gas turbine engine is a fan shaft of the gas turbine engine, and wherein operating the electric machine of the electric machine assembly in the electric motor mode comprises adding power to the fan shaft.

The method of any of the preceding clauses, wherein the second operating mode is a shutdown mode of the gas turbine engine.

The method of any of the preceding clauses, wherein operating the electric machine of the electric machine assembly in the electric motor mode comprises rotating the first drive shaft of the gas turbine engine while the gas turbine engine is in the shutdown mode with the electric machine.

The method of any of the preceding clauses, wherein the first drive shaft of the gas turbine engine is a low pressure shaft of the gas turbine engine, and wherein rotating the first drive shaft of the gas turbine engine while the gas turbine engine is in a shutdown mode comprises rotating the low pressure shaft of the gas turbine engine to prevent a rotor bow condition of the low pressure shaft.

The invention claimed is:

1. A gearbox assembly for a gas turbine engine comprising:
   a first planetary gear set comprising a sun gear, a planet gear, and a ring gear, the sun gear configured for connection to a first drive shaft of the gas turbine engine and the ring gear configured for connection to a second drive shaft of the gas turbine engine; and
   an electric machine assembly comprising a second planetary gear set, an input, and an electric machine, the electric machine comprising a rotor and a stator fixedly positioned to the gearbox assembly, the input of the electric machine assembly coupled to the first planetary gear set, and the rotor of the electric machine coupled to the input of the electric machine assembly across the second planetary gear set.

2. The gearbox assembly of claim 1, wherein the first planetary gear set further comprises a planet gear carrier, wherein the planet gear is rotatably coupled to the planet gear carrier, wherein the planet gear carrier is fixedly positioned within the gearbox assembly, and wherein the input of the electric machine assembly is coupled to the ring gear of the first planetary gear set.

3. The gearbox assembly of claim 1, wherein the sun gear, the planet gear, and the ring gear of the first planetary gear set are configured as a first sun gear, a first planet gear, and a first ring gear, wherein the second planetary gear set comprises a second sun gear, a second planet gear, and a second ring gear, wherein the input of the electric machine assembly is coupled to the second planet gear of the second planetary gear set.

4. The gearbox assembly of claim 3, wherein the rotor of the electric machine of the electric machine assembly is coupled to the second sun gear of the second planetary gear set.

5. The gearbox assembly of claim 4, wherein the second ring gear is fixedly positioned within the gearbox assembly.

6. The gearbox assembly of claim 1, wherein the input of the electric machine assembly is coupled to the ring gear of the first planetary gear set, wherein the planet gear of the first planetary gear set is a compound planet gear comprising a first stage and a second stage, wherein the first stage is engaged with the sun gear of the first planetary gear set, and wherein the second stage is engaged with to the ring gear of the first planetary gear set.

7. The gearbox assembly of claim 1, wherein the electric machine is arranged in an axial flux configuration.

8. The gearbox assembly of claim 1, wherein the electric machine is arranged in a radial flux configuration.

9. The gearbox assembly of claim 8, wherein the gearbox assembly defines a radial direction, and wherein the rotor is located inward of the stator along the radial direction.

10. The gearbox assembly of claim 8, wherein the gearbox assembly defines a radial direction, and wherein the rotor is located outward of the stator along the radial direction.

11. The gearbox assembly of claim 1, further comprising:
   a gearbox assembly casing extending between a forward end and an aft end;
   a first bearing assembly located at the aft end for rotatably mounting the gearbox assembly casing to the first drive shaft of the gas turbine engine at the aft end of the gearbox assembly casing; and
   a second bearing assembly located at the forward end for rotatably mounting the gearbox assembly casing to the second drive shaft of the gas turbine engine at the forward end of the gearbox assembly casing.

12. The gearbox assembly of claim 1, further comprising:
   a gearbox assembly casing, wherein the stator of the electric machine is fixedly within the gearbox assembly casing of the gearbox assembly.

13. The gearbox assembly of claim 1, wherein the input of the electric machine assembly is directly coupled to the ring gear of the first planetary gear set.

\* \* \* \* \*